United States Patent
Guzda et al.

(10) Patent No.: US 9,742,014 B2
(45) Date of Patent: Aug. 22, 2017

(54) METHOD FOR FORMING CHANNELS ON DIFFUSION MEDIA FOR A MEMBRANE HUMIDIFIER

(71) Applicant: GM Global Technology Operations LLC, Detroit, MI (US)

(72) Inventors: Jeffrey M. Guzda, Spencerport, NY (US); David A. Martinchek, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 14/685,789

(22) Filed: Apr. 14, 2015

(65) Prior Publication Data
US 2015/0221963 A1   Aug. 6, 2015

Related U.S. Application Data

(62) Division of application No. 12/884,361, filed on Sep. 17, 2010, now Pat. No. 9,048,468.

(51) Int. Cl.

| | |
|---|---|
| *B01D 63/08* | (2006.01) |
| *H01M 8/04119* | (2016.01) |
| *H01M 8/1018* | (2016.01) |
| *H01M 8/1023* | (2016.01) |
| *H01M 8/1039* | (2016.01) |
| *B01D 67/00* | (2006.01) |

(52) U.S. Cl.
CPC ...... *H01M 8/04149* (2013.01); *B01D 63/082* (2013.01); *B01D 67/0034* (2013.01); *H01M 8/04171* (2013.01); *H01M 8/1018* (2013.01); *H01M 8/1023* (2013.01); *H01M 8/1039* (2013.01); *B01D 2319/02* (2013.01); *Y02E 60/521* (2013.01); *Y02P 70/56* (2015.11); *Y10T 156/1023* (2015.01)

(58) Field of Classification Search
CPC ............. B01D 63/082; B01D 67/0034; B01D 2319/02; H01M 8/04149; H01M 8/04171; H01M 8/1018; H01M 8/1023; H01M 8/1039; Y02E 60/521; Y02P 70/56; Y10T 156/1023
USPC .................................. 261/104, 107
See application file for complete search history.

(56) References Cited

U.S. PATENT DOCUMENTS

| | | | | |
|---|---|---|---|---|
| 4,514,475 A | * | 4/1985 | Mientek | H01M 8/0206 429/460 |
| 5,624,610 A | * | 4/1997 | Yokoya | F24F 3/1417 134/3 |
| 5,996,976 A | * | 12/1999 | Murphy | B01D 53/22 261/104 |
| 6,471,195 B2 | | 10/2002 | Shimanuki et al. | |
| 7,036,466 B2 | | 5/2006 | Goebel et al. | |
| 7,156,379 B2 | | 1/2007 | Tanihara et al. | |

(Continued)

*Primary Examiner* — Charles Bushey
(74) *Attorney, Agent, or Firm* — Quinn IP Law

(57) ABSTRACT

A membrane humidifier assembly for a membrane humidifier for a fuel cell system and a method for making the same is disclosed, the method comprising the steps of providing a material for forming a diffusion medium; forming a plurality of channels in the material with one of a channel-forming roller, a means for etching the material, and a press for forming the diffusion medium; and providing a pair of membranes, wherein the diffusion medium is disposed between the pair of membranes.

6 Claims, 6 Drawing Sheets

(56) References Cited

U.S. PATENT DOCUMENTS

| | | | |
|---|---|---|---|
| 7,459,167 B1 | 12/2008 | Sengupta et al. | |
| 7,572,531 B2 | 8/2009 | Forte | |
| 8,317,907 B2 * | 11/2012 | Martinchek | H01M 8/04141 |
| | | | 429/413 |
| 9,048,468 B2 * | 6/2015 | Guzda | H01M 8/04171 |
| 2004/0072055 A1 | 4/2004 | Getz et al. | |
| 2006/0029837 A1 | 2/2006 | Sennoun et al. | |
| 2008/0001313 A1 * | 1/2008 | Zhang | B01D 63/08 |
| | | | 261/100 |
| 2009/0092863 A1 | 4/2009 | Skala | |
| 2010/0019400 A1 * | 1/2010 | Robb | H01M 8/04126 |
| | | | 261/101 |
| 2010/0099000 A1 * | 4/2010 | Kanba | H01M 8/0213 |
| | | | 429/532 |

\* cited by examiner

METHOD FOR FORMING CHANNELS ON DIFFUSION MEDIA FOR A MEMBRANE HUMIDIFIER

CROSS-REFERENCE TO RELATED APPLICATION

This application is a divisional application of and claims the benefit of priority of U.S. patent application Ser. No. 12/884,361 filed on Sep. 17, 2010, now U.S. Pat. No. 9,048,468, hereby incorporated herein by reference in its entirety.

FIELD OF THE INVENTION

The invention relates to a membrane humidifier for a fuel cell system, and more particularly to a method of forming channels on diffusion media for a membrane humidifier.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly-owned U.S. Pat. No. 7,459,167, hereby incorporated herein by reference in its entirety. Fuel cell systems may also be used as stationary electric power plants in buildings and residences, as portable power in video cameras, computers, and the like. Typically, the fuel cell systems generate electricity used to charge batteries or to provide power for an electric motor.

Fuel cells are electrochemical devices that directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell system is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells, depending upon the context in which it is used. The plurality of cells is typically bundled together and arranged to form a stack, with the plurality of cells commonly arranged in electrical series. Since single fuel cells can be assembled into stacks of varying sizes, systems can be designed to produce a desired energy output level providing flexibility of design for different applications.

A typical fuel cell is known as the polymer electrolyte membrane (PEM) fuel cell, which combines the fuel the oxidant to produce electricity and water. In order to perform within a desired efficiency range, a sufficient humidification of the polymer electrolyte membranes of the fuel cell should be maintained. The sufficient humidification desirably extends the useful life of the polymer electrolyte membranes in the fuel cell, as well as maintains the desired efficiency of operation. Therefore, it is necessary to provide a means for maintaining the fuel cell membranes in the humidified condition. Maintaining the fuel cell membranes in the humidified condition helps avoid a shortened life of the membranes as well as to maintain the desired efficiency of operation. For example, lower water content of the membrane leads to a higher proton conduction resistance, thus resulting in a higher ohmic voltage loss. The humidification of the feed gases, in particular at the cathode inlet, is desirable in order to maintain sufficient water content in the membrane. Humidification in a fuel cell is discussed in commonly-owned U.S. Pat. No. 7,036,466 to Goebel et al.; commonly-owned U.S. patent application Ser. No. 10/912,298 to Sennoun et al.; and commonly-owned U.S. Pat. No. 7,572,531 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. Pat. No. 7,156,379 to Tanihara et al., hereby incorporated herein by reference in its entirety, and U.S. Pat. No. 6,471,195 to Shamanuki et al., hereby incorporated herein by reference in its entirety.

As part of a fuel cell system, a water vapor transfer (WVT) device, also known as a membrane humidifier, may be used to humidify the air stream entering the fuel cell stack. The WVT device transfers water vapor from an exhaust stream from the fuel cell stack to a feed stream entering the fuel cell stack. This is generally accomplished by using a water vapor transfer membrane that allows only water vapor to pass therethrough. This membrane may be permanently attached to a diffusion media layer. The locations where the membrane is attached to the separator are desirably leak free. The membrane and diffusion media layer combination may be referred to as a separator, a separator plate, or a membrane humidifier assembly.

It is known to manufacture a water vapor transfer separator consisting of a plastic plate with flow channels either machined or molded into the plastic plate. The gas diffusion and membrane layers are attached to the plastic plate using pressure sensitive adhesive (PSA). However, the PSA is difficult and time consuming to apply. Additionally, where the PSA has not been applied correctly, repair of separator may be time consuming and costly, possibly requiring replacement rather than repair. Furthermore, use of a plastic plate increases the overall dimensions of the separator plate.

An exemplary membrane humidifier for a fuel cell system that does not involve a plastic plate is disclosed in commonly-owned U.S. Pat. Appl. Pub. No. 2009/0092863 to Skala, which is hereby incorporated herein by reference in its entirety. The Skala patent application describes a membrane humidifier assembly for a membrane humidifier having a top layer formed from a diffusion medium and a bottom layer formed from a diffusion medium. The diffusion medium is formed from a glass fiber impregnated with an uncured resin. The resin is cured (a process referred to as "calendaring") with heat and pressure. The curing process controls the thickness of the diffusion medium. An array of substantially planar elongate ribbons is disposed between the top and bottom diffusion medium layers. Appropriate alignment of the ribbons between the diffusion medium layers is time consuming and difficult. Furthermore, when the ribbons are fixed to the diffusion medium layers, the ribbons may be pressed into the diffusion medium layers, thereby creating high resistance areas militating against the flow of fluids through the gas diffusion mediums. A membrane is adhered to at least one of the top and bottom diffusion medium layers.

It would be desirable to produce a membrane humidifier assembly for a membrane humidifier, wherein the dimensions of the assembly, the material costs of the membrane humidifier and the assembly, and the assembly time of the membrane humidifier are minimized.

SUMMARY OF THE INVENTION

Concordant and congruous with the present invention, an assembly for a membrane humidifier, wherein the dimensions of the assembly, the material costs of the membrane humidifier and the assembly, and the assembly time of the membrane humidifier are minimized, has surprisingly been discovered.

In one embodiment, a method for making a membrane humidifier assembly for a membrane humidifier for a fuel cell system, the method comprises the steps of providing a material for forming a diffusion medium; forming a plurality of channels in the material for forming the diffusion medium; and providing a pair of membranes, wherein the diffusion medium is disposed between the pair of membranes.

In another embodiment, a method for making a membrane humidifier assembly for a membrane humidifier for a fuel cell system, the method comprises the steps of providing a material for forming a diffusion medium, wherein the material is one of a glass fiber impregnated with a resin, a glass based-paper impregnated with a resin, a carbon fabric impregnated with a resin, and a paper impregnated with a resin; providing a channel-forming roller adapted to form a plurality of channels in the material; forming the plurality of channels in the material with the channel-forming roller for forming the diffusion medium; and providing a pair of membranes, wherein the diffusion medium is disposed between the pair of membranes.

In another embodiment, a membrane humidifier assembly for a membrane humidifier for a fuel cell comprises a first diffusion medium; a second diffusion medium having a plurality of channels formed therein, wherein the second diffusion medium is formed from a cured material impregnated with a resin; and a pair of polymer membranes between which the first diffusion medium and the second diffusion medium are disposed.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
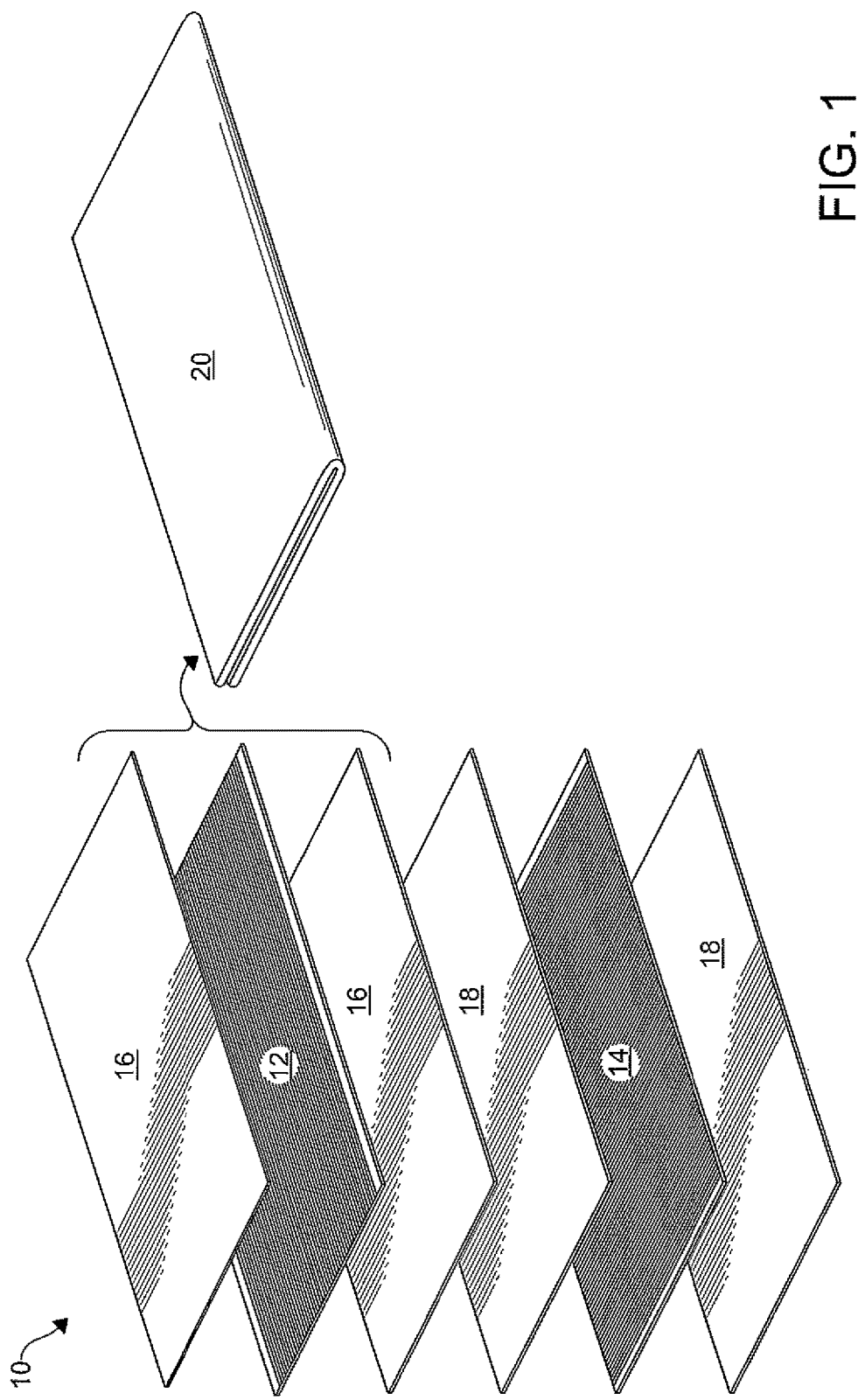
FIG. 1 is an exploded perspective view of a membrane humidifier assembly as known in the art.
Figure 2:
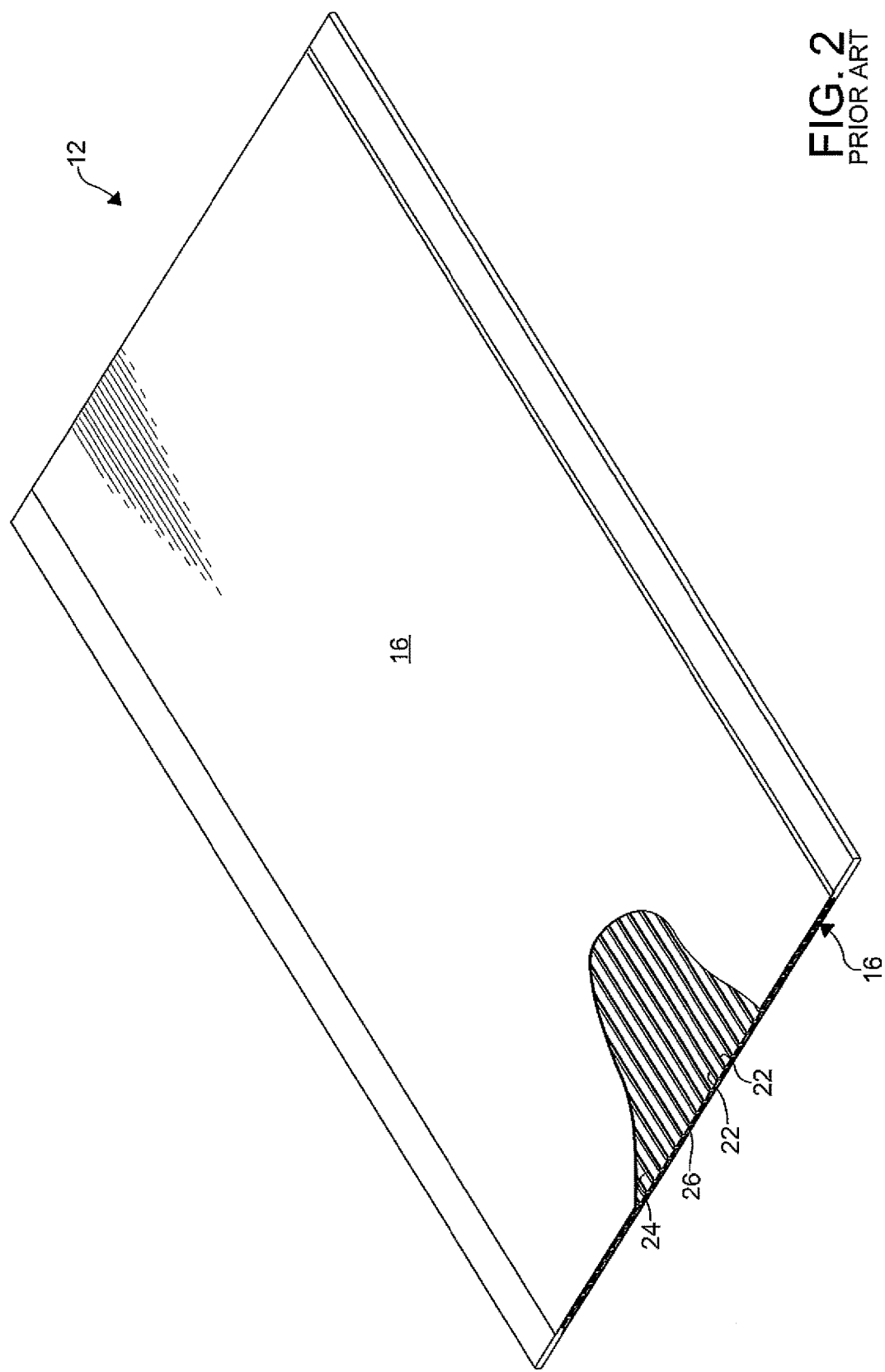
FIG. 2 is a perspective view of a wet plate of the membrane humidifier assembly of FIG. 1.

FIG. 1 illustrates a membrane humidifier assembly 10 for a fuel cell system (not shown) as is known in the art. The membrane humidifier assembly 10 includes a wet plate 12, a dry plate 14, diffusion media 16, 18, and a membrane 20. The membrane humidifier assembly 10 for a cathode side of a fuel cell of the fuel cell system is described. However, it is understood that the membrane humidifier assembly 10 can be used for an anode side of the fuel cell or otherwise as desired. As best shown in FIG. 2, the wet plate 12 includes a plurality of flow channels 22 formed therein. A land 24 is formed between each of the laterally adjacent flow channels 22 in the wet plate 12, while a web 26 is formed between vertically adjacent flow channels 22. The flow channels 22 are adapted to convey a wet gas from the cathode of the fuel cell to an exhaust (not shown).

The dry plate 14 is similar to the wet plate 12 as described herein. The dry plate 14 includes a plurality of flow channels (not shown) formed therein. Similar to the wet plate 12, a land (not shown) is formed between each of the laterally adjacent channels in the dry plate 14, while a web (not shown) is formed between vertically adjacent channels. The channels are adapted to convey a dry gas from a source of gas (not shown) to the cathode of the fuel cell. As used herein, wet gas means a gas such as air and gas mixtures of $O_2$, $N_2$, $H_2O$, and $H_2$, for example, including water vapor and/or liquid water therein at a level above that of the dry gas. Dry gas means a gas such as air and gas mixtures of $O_2$, $N_2$, $H_2O$, and $H_2$, for example, absent water vapor or including water vapor and/or liquid water therein at a level below that of the wet gas. It is understood that other gases or mixtures of gases can be used as desired.

The diffusion medium or diffusion medium layer 16 is disposed adjacent both sides of the wet plate 12 and abuts the lands 24 thereof. Similarly, the diffusion medium or diffusion layer 18 is disposed adjacent both sides of the dry plate 14 and abuts the lands 24 thereof. The diffusion media 16, 18 may be formed from any conventional material such as a glass fiber, a glass-based paper, a carbon fabric, a paper, and the like, for example. As shown in FIG. 1, the membrane 20 is disposed between the diffusion medium 16 and wet plate 12 and the diffusion medium 18 and the dry plate 14. The membrane 20 can be any conventional membrane such as perfluorosulfonic acid (PFSA) such as sold under the trademark Nafion®, hydrophilic polymer membranes, or polymer composite membranes, for example.

Figure 3:
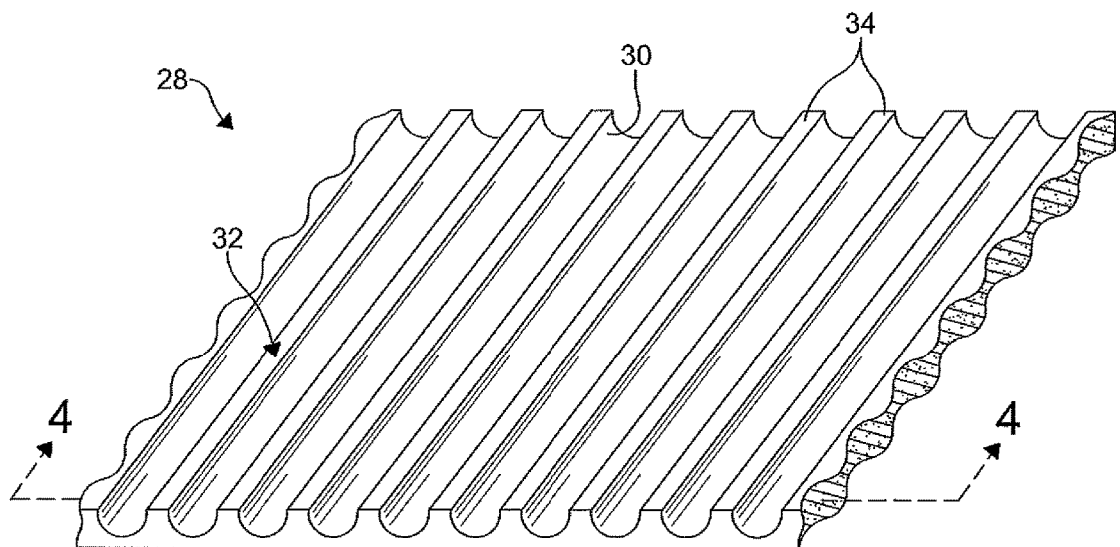
FIG. 3 is a fragmentary perspective view of a diffusion medium for a membrane humidifier assembly according to an embodiment of the invention.
Figure 4:
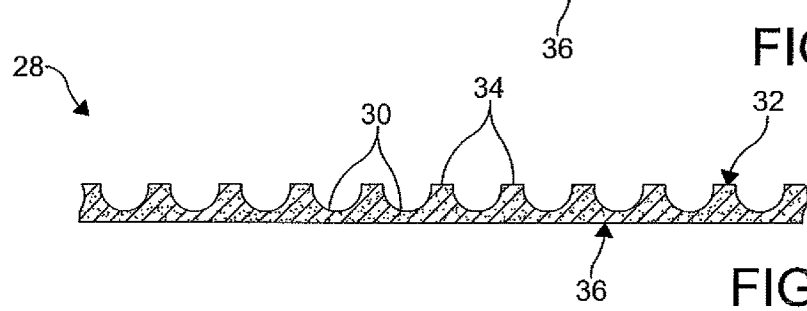
FIG. 4 is a fragmentary front cross-sectional elevational view of the diffusion medium illustrated in FIG. 3 taken along line 4-4 showing flow channels formed therein.
Figure 7:
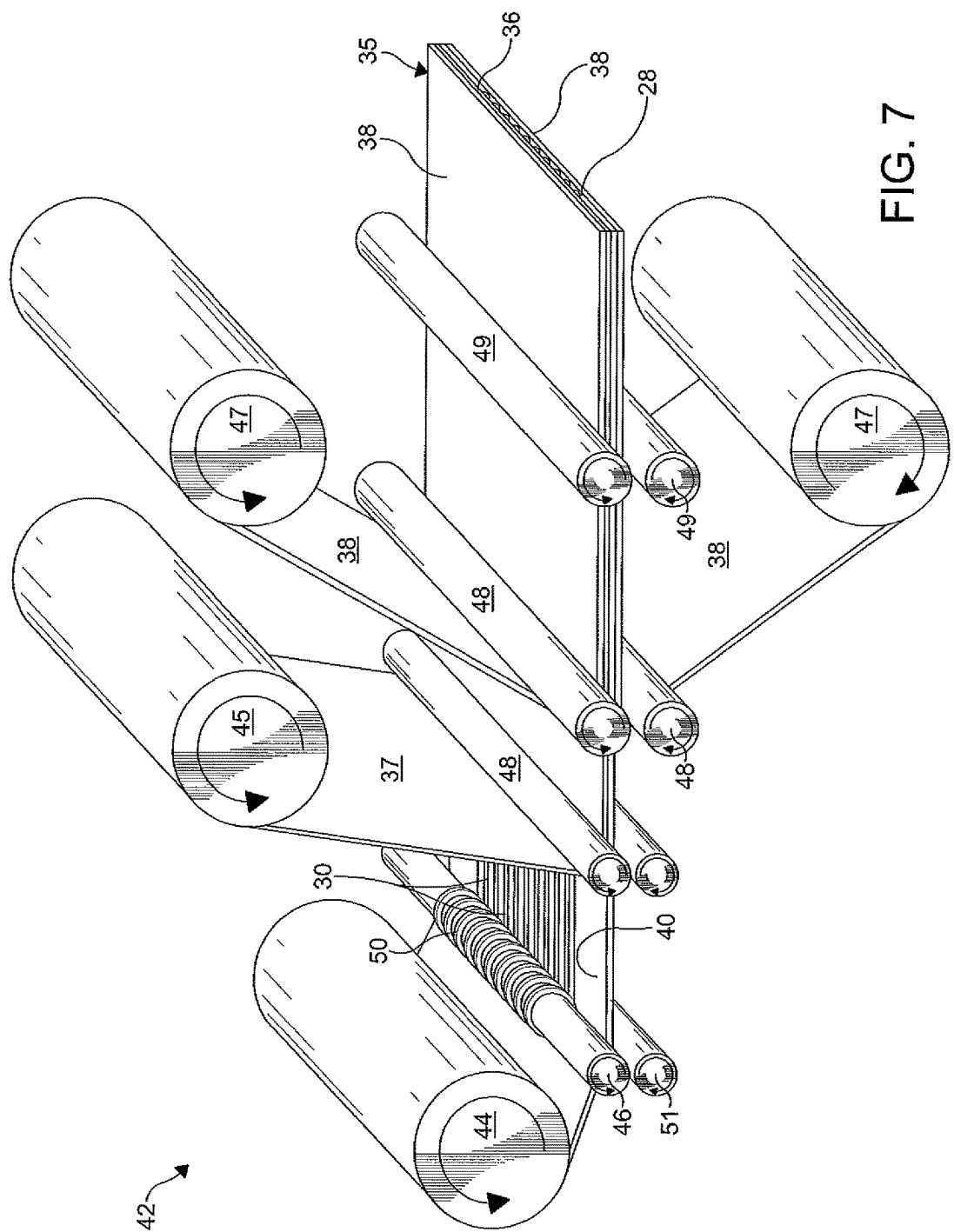
FIG. 7 is a schematic perspective view of a process for forming the diffusion medium of FIG. 3 according to an embodiment of the invention.

FIGS. 3 and 4 illustrate a diffusion medium 28 according to an embodiment of the invention. A plurality of channels 30 is formed in a first surface 32 of the diffusion medium 28. A land 34 is formed between each of the plurality of channels 30. A second surface 36 of the diffusion medium 28 is substantially planar and does not include channels. As shown, each of the plurality of channels 30 is substantially linear and has a substantially u-shaped cross-section. The plurality of channels 30 may be serpentine or undulated, as desired, and the channels may have any cross-sectional shape, such as v-shaped, rectilinear, or another design, as desired. It is understood that the channels 30 may also be formed on the second surface 36, as desired. As best shown in FIG. 7, outer peripheral edges of the diffusion medium 28 form substantially planar sealing bars 40 that do not include the channels 30. The sealing bars 40 may be formed from a material melt-adhered to the diffusion medium 28, a material attached to the diffusion medium 28 with an adhesive, or the sealing bars 40 may be formed from an uncured portion of the material forming the diffusion medium 28. It is understood that the diffusion medium 28 may be formed without the sealing bars 40, as desired.

Figure 5:
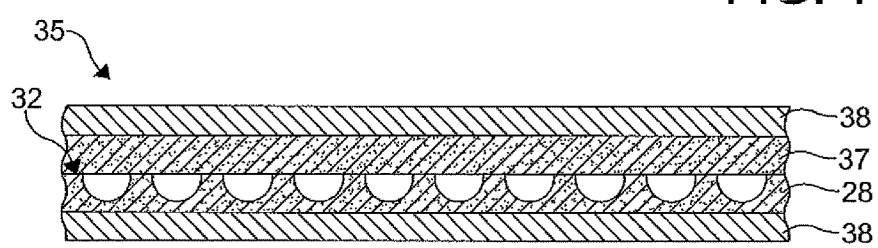
FIG. 5 is a fragmentary cross-sectional elevational view of a membrane humidifier assembly incorporating the diffusion medium of FIG. 3.

FIG. 5 illustrates a membrane humidifier assembly 35 incorporating the diffusion medium 28. The membrane humidifier assembly 35 includes the diffusion medium 28 disposed adjacent a substantially planar second diffusion medium 37. The diffusion media 28, 37 are disposed between a pair of polymer membranes 38. The second diffusion medium 37 provides structural support to the membrane humidifier assembly 35 and militates against a portion of one of the membranes 38 contacting the channels 30 of the diffusion medium 28. It is understood that the membrane humidifier assembly 35 may be assembled without the second diffusion medium 37 if the membranes 38 are sufficiently rigid to militate against a portion of one of the membranes 38 contacting the channels 30 of the diffusion medium 28. The diffusion medium 28 functions as a wet plate for a membrane humidifier assembly (not shown) similar to the membrane humidifier assembly 10 described herein. However, it is understood that the diffusion medium 28 can function as a dry plate for the membrane humidifier assembly 10. The diffusion media 28, 37 may be formed from any conventional material such as a glass fiber, a glass-based paper, a carbon fabric, a paper, and the like, for example. The polymer membranes 38 may be any conventional membrane such as perfluorosulfonic acid (PFSA) such as sold under the trademark Nafion®, hydrophilic polymer membranes, and polymer composite membranes, for example. A thickness of the membrane humidifier assembly 35 is less than a thickness of the membrane humidifier assembly 10 because the membrane humidifier assembly 35 does not include the separately-formed plates 12, 14. By minimizing the thickness of the membrane humidifier assembly 35, more membrane humidifier assemblies 35 may be installed in a membrane humidifier or a water vapor transfer (WVT) unit for use within the fuel cell system, or a smaller membrane humidifier may be used without affecting a performance thereof. By minimizing the size of the membrane humidifier, the cost and size of the fuel cell system is minimized. Further, by forming the flow channels in the diffusion media 28 and eliminating the use of a wet plate and a dry plate, the cost of the membrane humidifier assembly 35 and the time required to assembly the membrane humidifier assembly 35 is minimized.

Figure 6:
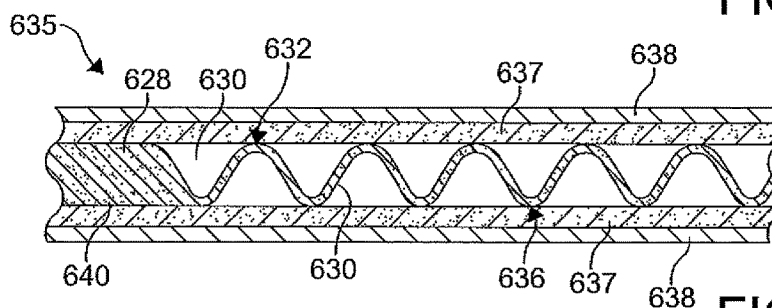
FIG. 6 is a fragmentary cross-sectional elevational view of a membrane humidifier assembly according to another embodiment of the invention.

FIG. 6 shows a membrane humidifier assembly 635 according to another embodiment of the invention. The embodiment of FIG. 6 is similar to the membrane humidifier assembly 35 of FIG. 5 except as described below. Like the structure from FIG. 5, FIG. 6 includes reference numerals in the 600s instead of the 10s, with the last two digits the same. The membrane humidifier assembly 635 includes a diffusion medium 628 having an undulated cross-section. A plurality of channels 630 is formed in a first surface 632 and a second surface 636 of the diffusion medium 628. The channels 630 of the first surface 632 are offset from the channels 630 formed in the second surface 636. Each of the plurality of channels 630 is substantially linear and has a substantially u-shaped cross-section. The plurality of channels 630 may be serpentine or undulated, as desired, and the channels may have any cross-sectional shape, such as v-shaped, rectilinear, or another design, as desired. Outer peripheral edges of the diffusion medium 628 form substantially planar sealing bars 640 that do not include the channels 630. The sealing bars 640 may be formed from a material melt-adhered to the diffusion medium 628, a material attached to the diffusion medium 628 with an adhesive, or the sealing bars 640 may be formed from an uncured portion of the material forming the diffusion medium 628. It is understood that the diffusion medium 628 may be formed without the sealing bars 640, as desired.

As shown, the diffusion medium 628 is disposed between a pair of substantially planar diffusion media 637. The diffusion media 628, 637 are disposed between a pair of polymer membranes 638. It is understood that the diffusion medium 628 may be disposed between the pair of membranes 638 without the pair of substantially planar diffusion media 637, as desired. The diffusion medium 628 functions as a wet plate for a membrane humidifier assembly (not shown) similar to the membrane humidifier assembly 10 described hereinabove. However, it is understood that the diffusion medium 628 can function as a dry plate for the membrane humidifier assembly 10. The diffusion media 628, 637 may be formed from any conventional material such as a glass fiber, a glass-based paper, a carbon fabric, a paper, and the like, for example. The polymer membranes 638 may be any conventional membrane such as perfluorosulfonic acid (PFSA) such as sold under the trademark Nafion®, hydrophilic polymer membranes, and polymer composite membranes, for example. A thickness of the membrane humidifier assembly 635 is less than a thickness of the membrane humidifier assembly 10 because the membrane humidifier assembly 635 does not include the separately-formed plates 12, 14. By minimizing the thickness of the membrane humidifier assembly 635, more membrane humidifier assemblies 635 may be installed in a membrane humidifier or a water vapor transfer (WVT) unit for use within the fuel cell system, or a smaller membrane humidifier may be used without affecting a performance thereof. By minimizing the size of the membrane humidifier, the cost and size of the fuel cell system is minimized. Further, by forming the flow channels in the diffusion media 628 and eliminating the use of a wet plate and a dry plate, the cost of the membrane humidifier assembly 635 and the time required to assembly the membrane humidifier assembly 635 is minimized.

As illustrated in FIG. 7, the present disclosure further includes a continuous system 42 for forming the diffusion medium 28. The system 42 includes a first diffusion medium roll 44, a second diffusion medium roll 45, a channel-forming roller 46, a plurality of compression rollers 48, a pair of membrane rolls 47, and a pair of cut rollers 49. The channel-forming roller 46 includes a linear array of spaced-apart annular protuberances 50 adapted to form the channels 30 in the diffusion medium 28. The first diffusion medium roll 44 continuously provides the material forming the diffusion medium 28 for the membrane humidifier assembly 35. As the diffusion medium 28 is fed between the channel-forming roller 46 and a compression roller 51, the protuberances 50 of the channel-forming roller 46 press into the material forming the diffusion medium 28 to form the channels 30. The compression roller 51 and the channel-forming roller 46 also cooperate to guide the material from the first diffusion medium roll 44 past the channel-forming roller 46, and the compression roller 51 provides a structure against which the material is pressed while the channels 30 are formed in the material. It is understood that the material disposed on the first diffusion medium roll 44 may be cured prior to being fed between the channel-forming roller 46 and the compression roller 51. It is also understood that the channel-forming roller 46 and the compression roller 51 may be heated to cure the material as the material is guided therebetween. The compression roller 51 may include protuberances (not shown) to form channels in the second surface 36 of the diffusion medium 28, thereby forming the diffusion medium 628 shown in FIG. 6. To produce the undulated cross-section of the diffusion medium 628, the protuberances of the compression roller 51 would be offset from the protuberances formed on the channel-forming roller 46.

The second diffusion medium roll 45 continuously provides the material forming the second diffusion medium 37 for the membrane humidifier assembly 35. A pair of compression rollers 48 cooperates to guide the material from the second diffusion medium roll 45 past the pair of compression rollers 48. The pair of compression rollers 48 provides a structure between which the gas diffusion media 28, 37 are pressed together. It is understood that an adhesive may be disposed on at least one of the diffusion media 28, 37 to facilitate adhesion thereof. It is also understood that the material disposed on the second diffusion medium roll 45 may be cured prior to being fed between the pair of compression rollers 48, and that the pair of compression rollers 48 may be heated to cure the diffusion medium 37 as the diffusion media 28, 37 are pressed together.

The pair of membrane rolls 47 continuously provides the material forming the membranes 38 for the membrane humidifier assembly 35. Another pair of compression rollers 48 cooperates to guide the material from the membrane rolls 47 past the pair of compression rollers 48. The pair of compression rollers 48 provides a structure between which the gas diffusion media 28, 37 are pressed between the polymer membranes 38 to form the membrane humidifier assembly 35. It is understood that an adhesive may be disposed on at least one of the diffusion media 28, 37 and the polymer membranes 38 to facilitate adhesion thereof. The membrane humidifier assembly 35 is trimmed by the pair of cut rollers 49. It is understood that the pair of cut rollers 49 may be any conventional cutting devices such as a shearing device, a water jet cutting device, and the like, for example. The membrane humidifier assembly 35 may then be installed and used in a water vapor transfer unit of a fuel cell system or otherwise, as desired.

Figure 8:
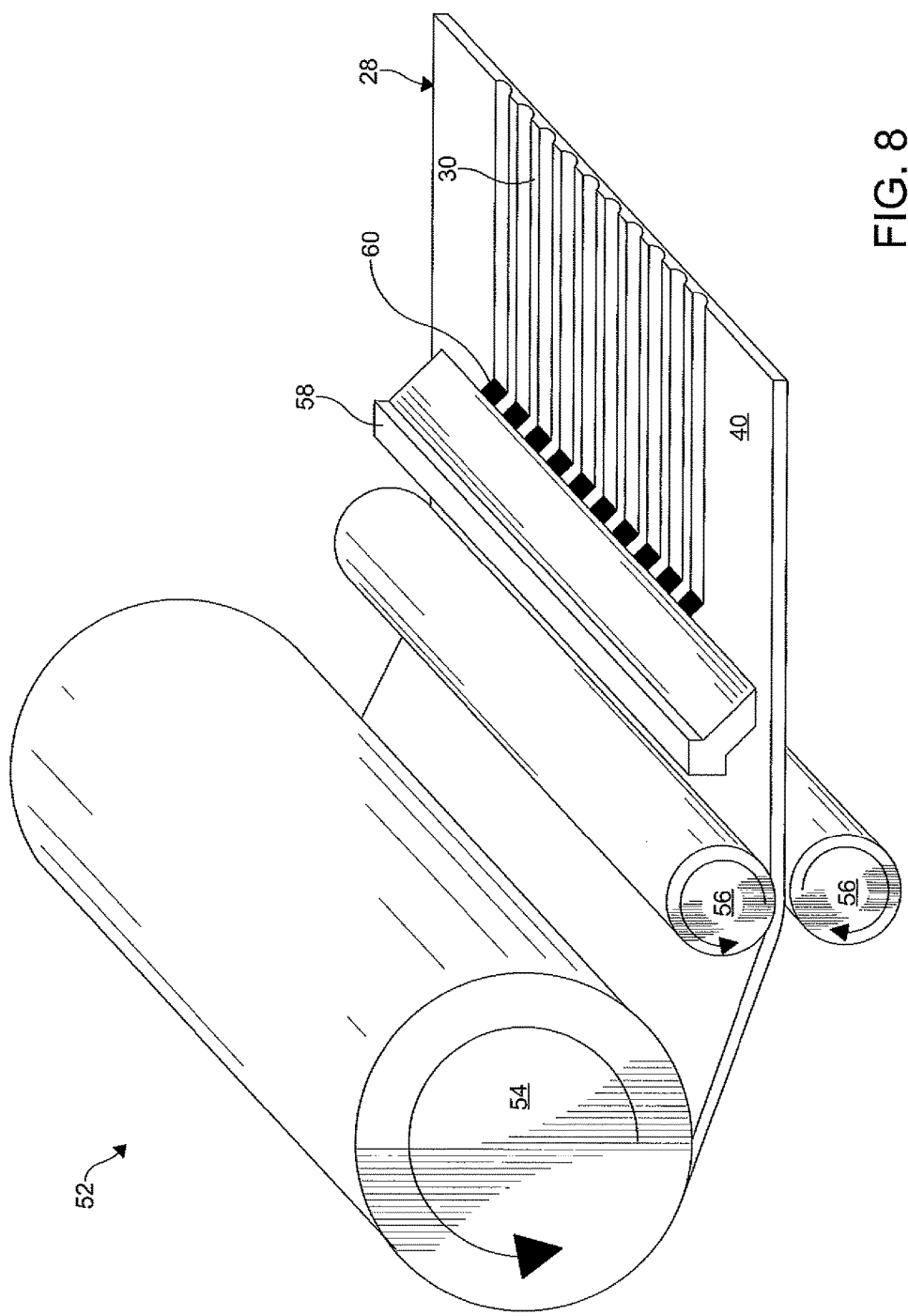
FIG. 8 is a schematic perspective view of a process for forming the diffusion medium of FIG. 3 according to another embodiment of the invention.

As illustrated in FIG. 8, the present disclosure further includes another continuous system 52 for forming the diffusion medium 28. The system 52 includes a diffusion medium roll 54, a pair of rollers 56, and a means for etching 58. The diffusion medium roll 54 continuously provides the material forming the diffusion medium 28 for the membrane humidifier assembly 35. The diffusion medium 28 is fed between the rollers 56 and under the means for etching 58. As the material passes under the means for etching 58, the material is etched to form the channels 30 therein. As shown, the means for etching 58 includes a linear array of lasers adapted to generate laser beams 60. It is understood that the material disposed on the diffusion medium roll 54 may include a cured resin or the material may be cured prior to being fed between the rollers 56. It is also understood that the rollers 56 may be heated to cure the material prior to formation of the channels 30 thereon. Upon formation of the channels 30, the diffusion medium 28 may be further processed to form the diffusion medium assembly 35 as described hereinabove.

Figure 9:
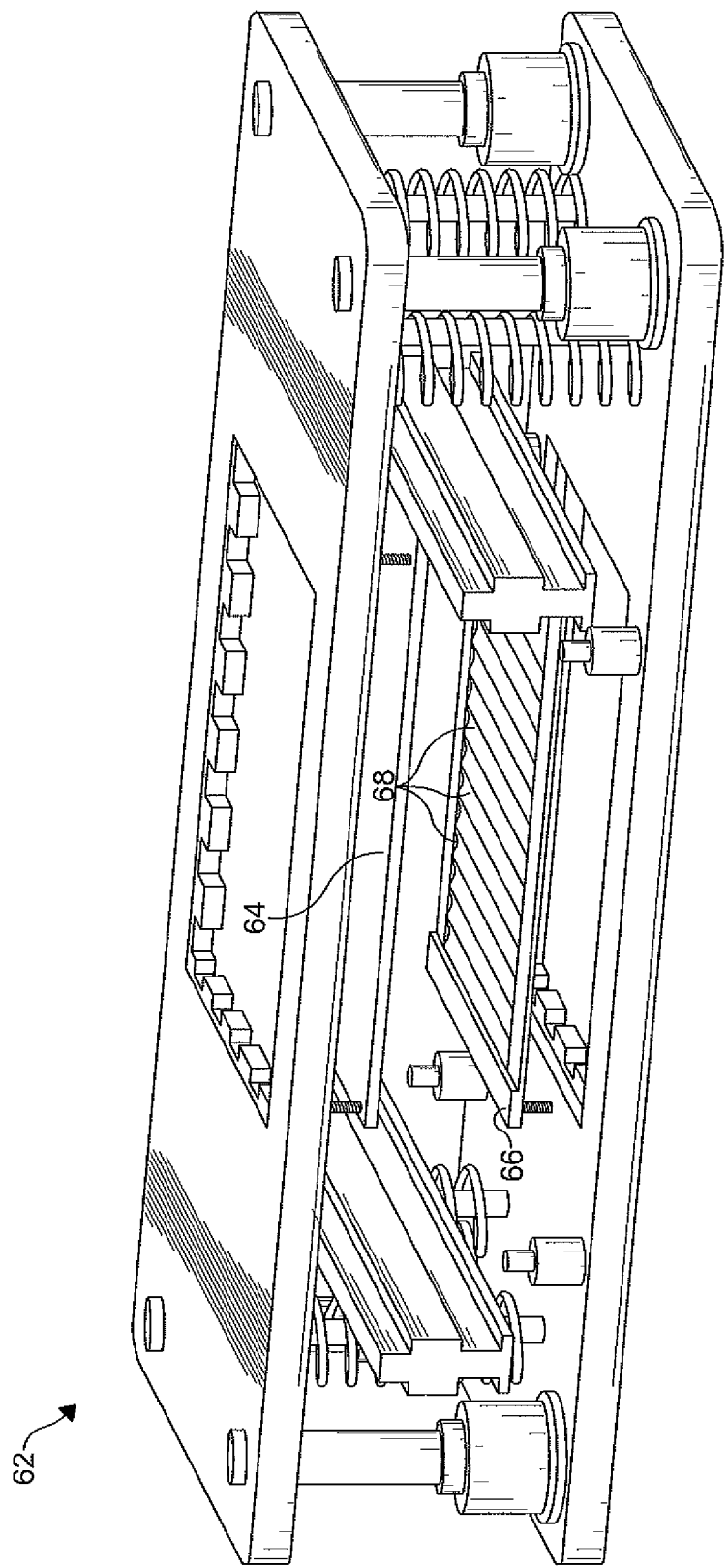
FIG. 9 is a schematic perspective view of a process for forming the diffusion medium of FIG. 3 according to another embodiment of the invention.

As illustrated in FIG. 9, the present disclosure further includes another system 62 for forming the diffusion medium 28 in a batch process. The system 62 is a press that includes a first platen 64 and a second platen 66. The first platen 64 is substantially planar. The second platen 66 is undulated and includes a plurality of protuberances 68 adapted to form the channels 30 in the material for forming the diffusion medium 28. One or more of the platens 64, 66 may be heated, as desired. The platens 64, 66 may open and close by a vertical movement of one or both of the platens 64, 66 by one of electrical, hydraulic, and pneumatic actuation. It is understood that the platens 64, 66 may be hinged or clam-shelled, and that the hinged or clam-shelled platens 64, 66 may be manually actuated to open and close. To form the diffusion medium 28, the material forming the diffusion medium 28 is disposed between the platens 64, 66. The platens 64, 66 are closed and the channels 30 are pressed into a surface of the material. If the material includes an uncured resin, the heated platen(s) 64, 66 will cure the resin as the channels are formed in the material. It is understood that the resin and material may be cured prior to being disposed in the system 62. Upon formation of the channels 30, the diffusion medium 28 may be further processed to form the diffusion medium assembly 35. To form the membrane humidifier assembly 35, the diffusion medium 28 is disposed adjacent the second diffusion medium 37, and the diffusion media 28, 37 are disposed between the pair of polymer membranes 38. It is understood that the system 62 may be a stand-alone system for producing diffusion media 28, or the system 62 may be part of a progressive process including additional equipment for forming membrane humidifier assemblies 35.

In use, a plurality of membrane humidifier assemblies 35 is stacked in a membrane humidifier. A wet gas is caused to flow through the channels 30 formed in the diffusion medium 28 in the membrane humidifier. The wet gas is received from a supply of wet gas. Any conventional means can be used to deliver the wet gas to the channels 30 such as a supply header in communication with the channels 30, for example. The wet gas may be supplied from an exhaust stream of the fuel cell system, as desired. The wet gas exits the channels 30 to the exhaust. A dry gas is caused to flow through the channels formed in a dry side membrane humidifier assembly of the membrane humidifier. The dry gas is received from the supply of dry gas. Any conventional means can be used to deliver the dry gas to the channels such as a supply header in communication with the channels, for example. The dry gas then exits the channels formed in the dry side membrane humidifier assembly to a component of the fuel cell system such as a compressor (not shown), for example, or the dry gas may exit to the exhaust.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A membrane humidifier assembly for a membrane humidifier for a fuel cell comprising:
   a first diffusion medium;
   a second diffusion medium having a plurality of channels formed in a first surface thereof, wherein the second diffusion medium is formed from a cured material impregnated with a resin; and
   a pair of polymer membranes between which the first diffusion medium and the second diffusion medium are disposed.

2. The membrane humidifier assembly of claim 1, the second diffusion medium having a plurality of channels formed in a second surface thereof.

3. The membrane humidifier assembly of claim 2, further comprising a pair of substantially planar sealing bars formed on a pair of outer peripheral edges of the second diffusion medium.

4. The membrane humidifier assembly of claim 3, wherein the sealing bars are formed from one of a material melt-adhered to the second diffusion medium and a material attached to the second diffusion medium with an adhesive.

5. The membrane humidifier assembly of claim 4, wherein the sealing bars are formed from an uncured portion of the material forming the second diffusion medium.

6. The membrane humidifier assembly of claim 1, wherein the plurality of channels is formed by one of a press having a substantially planar first plate and an undulated second plate and a means for etching.

* * * * *